(12) United States Patent
Lee et al.

(10) Patent No.: US 12,542,308 B2
(45) Date of Patent: Feb. 3, 2026

(54) POUCH BATTERY WITH SAFETY PROTECTION FUNCTION

(71) Applicant: TECHTRONIC CORDLESS GP, Anderson, SC (US)

(72) Inventors: Hei Man Raymond Lee, Kwai Chung (HK); Ming Jun Zhuang, Dongguan (CN)

(73) Assignee: Techtronic Power Tools Technology Limited

( * ) Notice: Subject to any disclaimer, the term of this patent is extended or adjusted under 35 U.S.C. 154(b) by 522 days.

(21) Appl. No.: 17/549,069

(22) Filed: Dec. 13, 2021

(65) Prior Publication Data

US 2022/0102785 A1    Mar. 31, 2022

Related U.S. Application Data

(63) Continuation of application No. 16/285,287, filed on Feb. 26, 2019, now Pat. No. 11,201,366.

(30) Foreign Application Priority Data

Feb. 27, 2018   (CN) .......................... 201820278528.9

(51) Int. Cl.
*H01M 10/48*      (2006.01)
*H01M 10/42*      (2006.01)
(Continued)

(52) U.S. Cl.
CPC ..... *H01M 10/488* (2013.01); *H01M 10/4257* (2013.01); *H01M 10/48* (2013.01);
(Continued)

(58) Field of Classification Search
CPC ........... H01M 10/488; H01M 10/4257; H01M 10/48; H01M 50/105; H01M 50/178;
(Continued)

(56) References Cited

U.S. PATENT DOCUMENTS 6,312,851 B1   11/2001   Fukada et al.
11,165,126 B2   11/2021   Fauteux et al.
(Continued)

FOREIGN PATENT DOCUMENTS

CA    2884449 A1    8/2013
CA    2985451 A1    6/2018
(Continued)

OTHER PUBLICATIONS

International Preliminary Report on Patentability for Application No. PCT/CN2015/086488 dated Feb. 14, 2017 (6 pages).
(Continued)

*Primary Examiner* — Daniel S Gatewood
(74) *Attorney, Agent, or Firm* — Michael Best & Friedrich LLP

(57) ABSTRACT

A pouch battery contains a pouch, an electrode material and a safety protection device. The electrode material is located in the pouch. The safety protection device is configured to generate an action based on a change in gas pressure within the pouch. In this way, even if the pouch battery is abnormal, its internal circuit can be cut off in time to avoid providing power to external devices while being under abnormal conditions.

7 Claims, 2 Drawing Sheets

(51) Int. Cl.
  *H01M 50/105* (2021.01)
  *H01M 50/178* (2021.01)
  *H01M 50/342* (2021.01)
  *H01M 50/55* (2021.01)
  *H01M 50/557* (2021.01)
  *H01M 50/578* (2021.01)

(52) U.S. Cl.
  CPC ....... *H01M 50/105* (2021.01); *H01M 50/178* (2021.01); *H01M 50/342* (2021.01); *H01M 50/55* (2021.01); *H01M 50/557* (2021.01); *H01M 50/578* (2021.01); *H01M 2200/20* (2013.01)

(58) Field of Classification Search
  CPC .. H01M 50/342; H01M 50/55; H01M 50/557; H01M 50/578; H01M 2200/20; H01M 10/126; H01M 10/445; H01M 50/502; H01M 2220/30; Y02E 60/10
  See application file for complete search history.

(56) References Cited

U.S. PATENT DOCUMENTS

| | | | |
|---|---|---|---|
| 2001/0038938 A1 | 11/2001 | Takahashi | |
| 2005/0077878 A1 | 4/2005 | Carrier et al. | |
| 2009/0246607 A1 | 10/2009 | Shinyashiki et al. | |
| 2010/0291423 A1 | 11/2010 | Hideo et al. | |
| 2011/0097630 A1 | 4/2011 | Choi et al. | |
| 2011/0104520 A1* | 5/2011 | Ahn | H01M 50/574 429/7 |
| 2013/0115487 A1 | 5/2013 | Park et al. | |
| 2013/0143077 A1 | 6/2013 | Yebka et al. | |
| 2017/0229682 A1 | 8/2017 | Fauteux et al. | |

FOREIGN PATENT DOCUMENTS

| | | | |
|---|---|---|---|
| CA | 3010663 A1 | | 7/2019 |
| CN | 201069792 Y | | 6/2008 |
| CN | 106356494 A | | 1/2017 |
| CN | 205992572 U | | 3/2017 |
| JP | 2000067846 A | | 3/2000 |
| KR | 20140139793 A | * | 12/2014 |
| WO | 2013005922 A1 | | 1/2013 |

OTHER PUBLICATIONS

International Search Report and Written Opinion for Application No. PCT/CN2015/086488 dated Oct. 27, 2015 (8 pages).
European Patent office Search Report for Application No. 15830550.8 dated Dec. 5, 2017, 9 pages.
Australian Patent Office Examination Report No. 1 for Application No. 2015299442 dated Dec. 20, 2017, 3 pages.
United States Patent Office Action For U.S. Appl. No. 15/502,602 dated Nov. 29, 2018, 7 pages.
United States Patent Office Notice of Allowance for U.S. Appl. No. 15/502,602 dated Nov. 29, 2018, 7 pages.
European Patent Office Examination Report for Application No. 15830550.8 dated Jul. 31, 2020 (4 pages).
Office Action issued by the Chinese Patent Office for Application No. 201820278528.9 dated Aug. 10, 2018 (3 pages including statement of relevance).
Office Action issued by the Chinese Patent Office for Application No. 201820278528.9 dated Dec. 5, 2018 (3 pages including statement of relevance).
Canadian Patent Office Action for Application No. 3,035,053 dated May 16, 2023 (3 pages).
Canadian Patent Office Action for Application No. 3,035,053 dated Jul. 30, 2024 (4 pages).

* cited by examiner

POUCH BATTERY WITH SAFETY PROTECTION FUNCTION

CROSS-REFERENCE TO RELATED APPLICATION

This application is a continuation of U.S. patent application Ser. No. 16/285,287, filed Feb. 26, 2019, the entire content of which is hereby incorporated by reference.

FIELD OF THE DISCLOSURE

The invention relates to a pouch battery, and more particularly to safety issues associated with pouch batteries.

BACKGROUND

The biggest difference between a pouch battery and a conventional steel-case or aluminum-case battery is that the pouch battery is made of a pouch material (plastic-aluminum composite film). This makes the pouch battery have the following advantages: light weight, compact dimension, flexible design, and arbitrary variation of the shape. Also, in the event of a safety issue, the pouch battery typically cracks, unlike an explosion in the case of a steel-case or aluminum-case battery.

However, although pouch batteries generally do not explode, because they do not have the protection from a similar hard case (steel case/aluminum case), the damaged pouch may cause expanded gas to be ejected from the pouch. At the same time, if the pouch battery still provides power to devices that are powered by the pouch battery, such as other components inside a power tool, this may pose a safety hazard.

SUMMARY

Therefore, there is a need for a technical solution which can further improve the safety of a pouch battery.

Embodiments of the present invention provide a pouch battery including a pouch, an electrode material located in the pouch, and a safety protection device. The safety protection device is configured to generate an action based on a change in gas pressure within the pouch.

In a specific embodiment, the pouch battery further includes an anode tab and a cathode tab. The anode tab and the cathode tab extend from the pouch. The safety protection device includes a circuit cut-off device. At least one of the anode tab and the cathode tab is connected to the electrode material by a circuit cut-off device.

Preferably, the circuit cut-off device is a circuit breaker. The circuit breaker is configured to cut off the electrical connection between at least one of the anode tab and the cathode tab, and the electrode material, when the gas pressure in the pouch reaches a predetermined value due to the gas expansion.

More preferably, the circuit breaker is configured to be mechanically separated into two parts, so as to cut off the electrical connection between at least one of the anode tab and the cathode tab, and the electrode material, when the pressure in the pouch reaches the predetermined value due to the gas expansion.

In another specific embodiment, the safety protection device includes: a pressure sensor; a controller connected to the pressure sensor; and an actuator connected to the controller. The actuator is configured to perform a safety action when receiving a control signal sent by the controller based on the gas pressure in the pouch detected by the pressure sensor which reaches a predetermined value due to gas expansion.

In a variable embodiment, the actuator is an alarm. The alarm is configured to send an alert to a user based on the control signal.

In another variable embodiment, the actuator is a switch. The switch is configured to cut off the electrical connection between at least one of the anode tab and the cathode tab and the electrode material in accordance with the control signal.

The invention provides corresponding safety protection mechanisms based on expansion characteristics of the pouch battery under high temperature or overcharge condition. Such expansion characteristics specifically refer to an increase in volume of the gas contained in a pouch battery due to a change in temperature resulted from a high temperature or overcharge. The change in gas volume results in an increase in the pressure within the fixed volume within the pouch, and such pressure can be used to cut off the circuit, thereby interrupting the internal circuit of the pouch battery. In this way, even if the pouch battery is abnormal, its internal circuit can be cut off in time to avoid providing power to external devices under abnormal conditions. This safety protection mechanism is completely built into the pouch battery and does not require any additional components to be arranged outside the pouch battery. Therefore, the pouch battery of the present invention can exerts its safety function regardless of how the electronic device is mounted without being bound by the electronic device. In addition to cutting off the circuit, the pouch battery of the present invention can also be configured to provide an alert to the user so that the user can know the abnormality of the pouch battery and eliminate the condition in time.

BRIEF DESCRIPTION OF THE DRAWINGS

The performance and advantages of the present invention can be further understood by reference to the remaining part of the specification and the accompanying drawings; in the drawings, the reference signs of the same components are the same. In some cases, a sub-label is placed after a label and hyphen to represent one of many similar components. When referring to a label but not specifically stating an existing sub-label, it refers to all of these similar components.

DETAILED DESCRIPTION OF PREFERRED EMBODIMENTS

In the embodiments of the invention, the circuit inside the pouch battery may be automatically cut off according to the expansion effect of the pouch battery resulted from high temperature or overcharge, thereby preventing the occurrence of an accident. Other different benefits and advantages provided by the various embodiments of the present invention are readily apparent from the following description.

Figure 1:
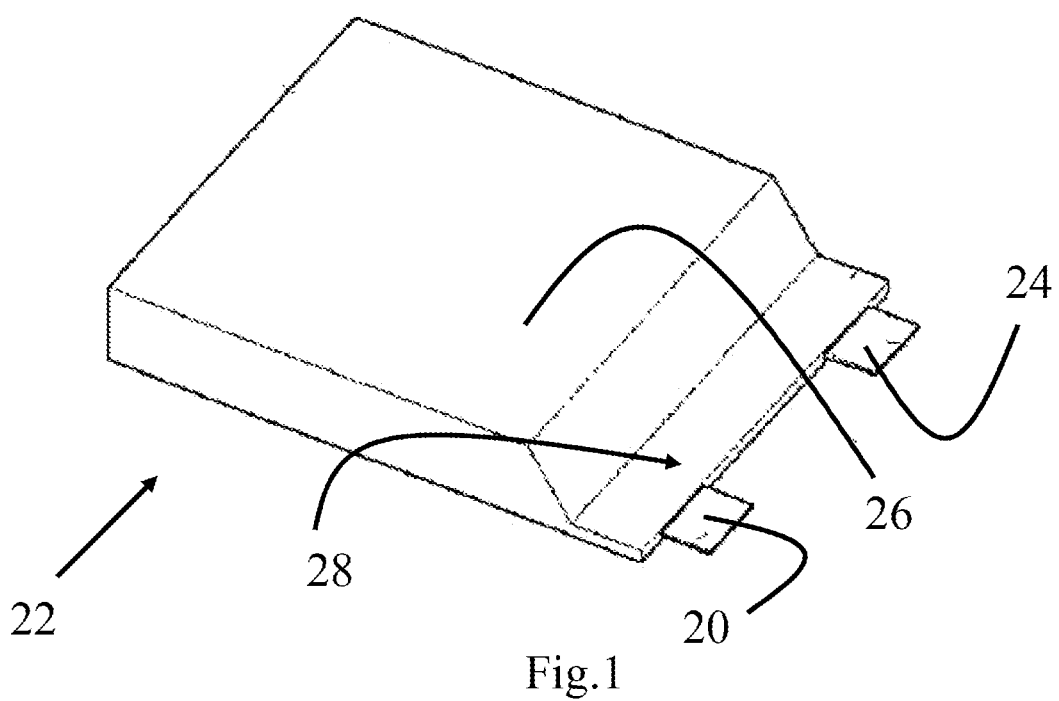
FIG. 1 is a schematic view showing the appearance of a pouch battery according to a first embodiment of the present invention.

Turning first to FIG. 1, there is shown the appearance of a pouch battery 22 in accordance with a first embodiment of the present invention. The pouch battery 22 includes a pouch 26 as its outer shell having a substantially rectangular shape. A front end 28 of the pouch 26 is formed by cutting and folding the pouch material. The pouch 26 is, for example, a plastic aluminum packaging film. The anode tab and a cathode tabs 20, 24 respectively extend from the front end 28 to facilitate connecting the pouch battery 22 to other external devices (not shown), such as a power tool. Above structure of the pouch battery 22 is well known to those skilled in the art and will not be described herein.

Figure 2A:
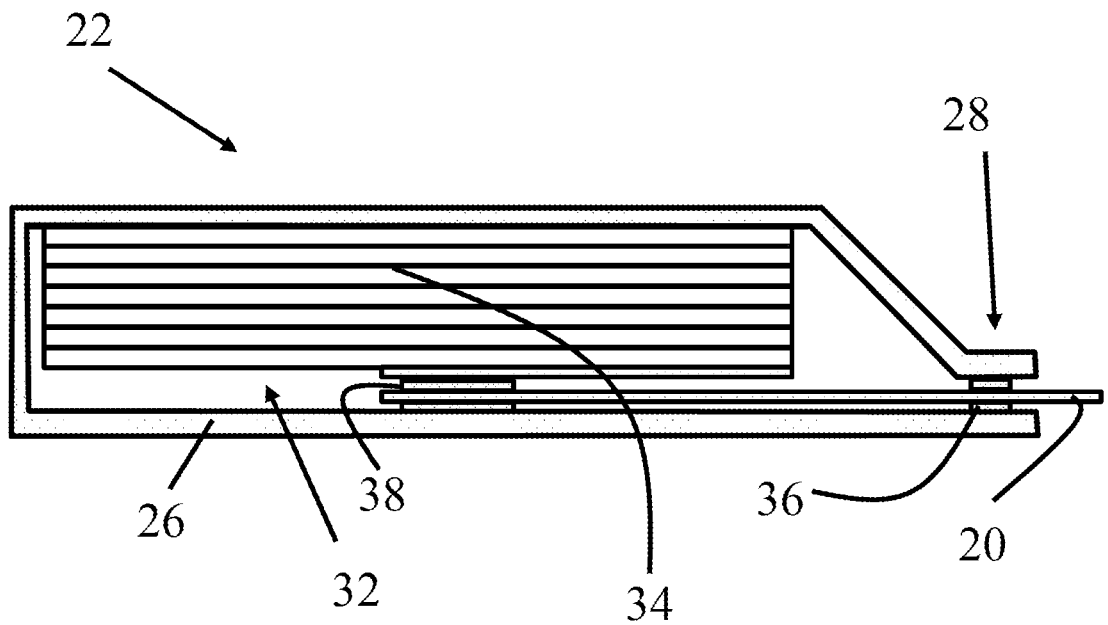
FIG. 2a is a schematic view showing the structure of the interior of the pouch battery of FIG. 1, in which the circuit breaker is not separated.
Figure 2B:
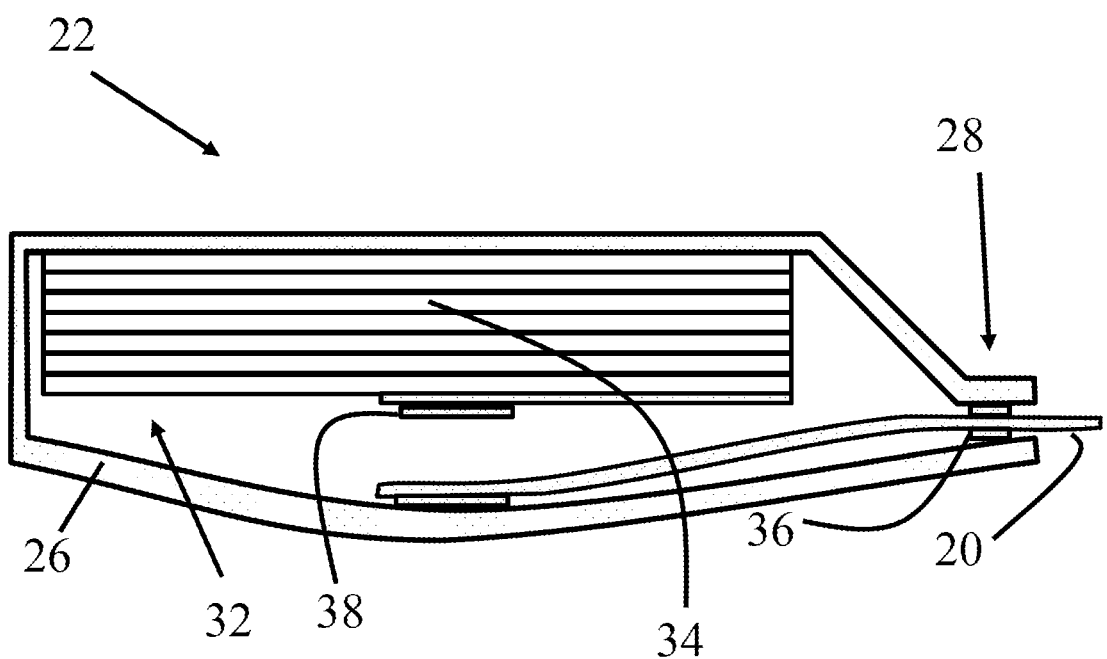
FIG. 2b is a schematic view showing the structure of the interior of the pouch battery of FIG. 1, in which the circuit breaker is disconnected due to the expansion effect.

Now turning to FIGS. 2a-2b. It can be seen that electrode material 34 is received in the pouch 26 of the pouch battery 22 described above. As is well known to those skilled in the art, the electrode material 34 includes an anode material, a cathode material, a separator, and the like (all are not shown). Between the electrode material 34 and the inner surface of the pouch 26, a gap 32 is present in at least a portion of the area of the pouch 26. The gas generated in the formation step in the production process of the pouch battery 22 exists in the gap 32. The electrode material is connected to the anode tab and a cathode tabs of the pouch battery 22. For the clarity of illustration, only the anode tab 20 is shown in FIGS. 2a and 2b, and the cathode tab is not shown. The anode tab 20 has an end extending beyond the pouch 26 as described above, specifically beyond the front end 28 of the pouch 26. The anode tab 20 is held by the front end 28 by the tab-film 36 near the front end 28 of the pouch 26. As shown in FIG. 2a, the other end of the anode tab 20 inside the pouch 26 (i.e., the end remote from the front end 28 of the pouch 26) is secured to the electrode material 34 by adhesive 38 which is electrically conductive. One surface of the other end of the anode tab 20 is bonded to the electrode material 34, and the other surface is connected to the inner surface of the pouch 26 by welding or the like. The anode tab 20 and the adhesive 38 described above together constitute the safety protection device of the present embodiment, and specifically constitute a circuit breaker.

Now we will see how the safety protection function of the above-mentioned pouch battery 22 works. FIG. 2 shows a state when the pouch battery 22 is operating normally. At this time, the pouch battery 22 does not generate high temperature or is overcharged, therefore the gas in the internal space 32 of the pouch 26 does not expand. Therefore, the circuit breaker of the pouch battery 22 is in an ON state and is not disconnected. As can be seen in FIG. 2a, the adhesive 38 connects the anode tab 20 to the electrode material 34 and there is an electrical connection between them. On the other hand, the anode tab 20 is also fixedly connected to the inner surface of the pouch 26. If the pouch battery 22 is subjected to high temperature or overcharge, the gas in the inner space 32 of the pouch 26 expands. This is also known as the expansion effect. The expansion of the gas causes its volume to increase and pressure is exerted on the boundary of the internal space 32. Such pressure causes the pouch 26 to deform because the pouch 26 is made of a kind of material that can be easily bent. If the pouch 26 on one side of the inner space 32 is deformed, the distance between this portion of the pouch 26 and the electrode material 34 on the other side of the inner space 32 is increased, which may cause a pulling force on the above-mentioned circuit breaker. In particular, such a pulling force results in the adhesive 38 no longer being sufficient to maintain the bonding between the electrode material 34 and the anode tab 20, which would separate the two. This is most clearly shown in FIG. 2b. Since the electrode material 34 and the anode tab 20 are no longer connected together, the electrical connection between them is also interrupted at the same time. This causes the pouch battery 22 to no longer externally output power, thereby ensuring the safety of the electric equipment.

Figure 3:
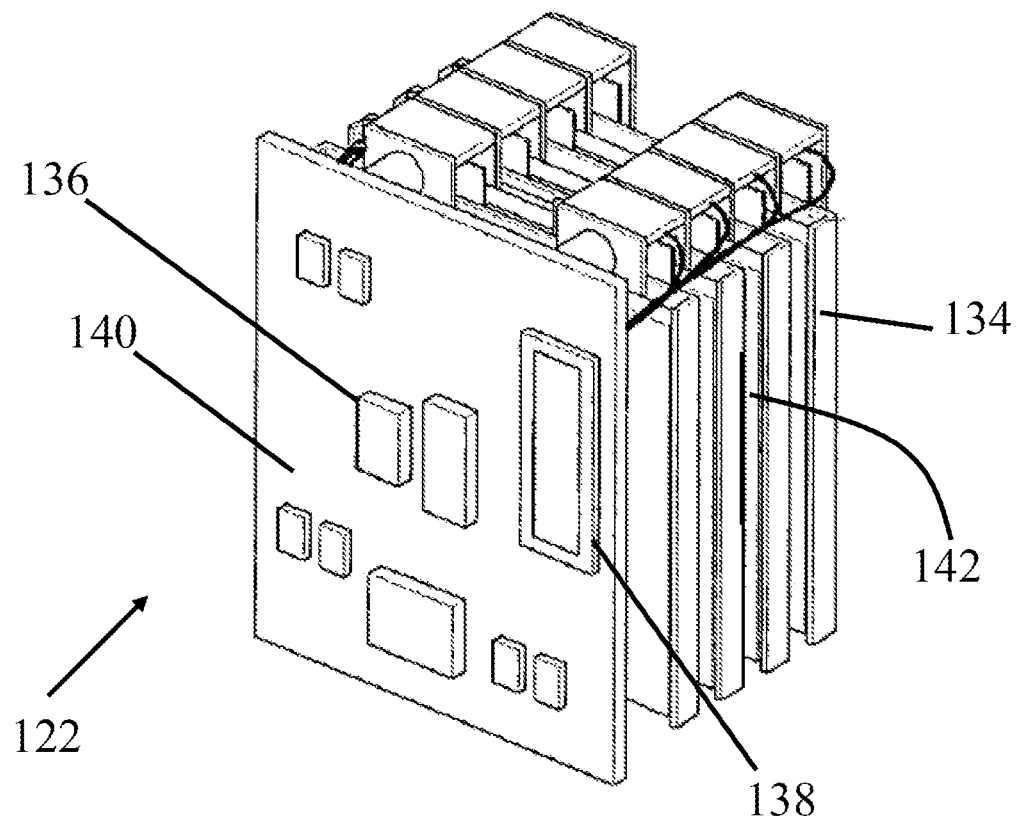
FIG. 3 is a perspective view of the inner component of the pouch battery after its pouch is removed, in accordance with another embodiment of the present invention.

Now turning to FIG. 3. A pouch battery 122 according to another embodiment of the present invention includes a circuit board 122 and an electrode material 134. A controller 136 and an actuator 138 are mounted on the circuit board 122. One end of the pressure sensor 142 is located between different layers in the electrode material 134, and the other end of the pressure sensor 142 is connected to the controller 136. Therefore, the pressure sensor 142 can provide the sensed pressure data inside the pouch battery 122 to the controller 136. The actuator 138 may be an alarm that gives a visual or audible alarm to the users, or a switch that may cut off the internal circuit of the pouch battery 122. The controller 136, the actuator 138, and the pressure sensor described above constitute the safety protection device in this embodiment.

During use, if the pouch battery 122 does not generate high temperature or overcharge, the gas inside the pouch battery 122 does not expand. Therefore, the pressure sensor 142 does not detect a pressure abnormality, and the controller 136 does not control the actuator 138 to perform any action. If the pouch battery 122 is subjected to high temperature or is overcharged, the gar expansion inside thereof causes the gas volume to increase and pressure is generated. Such pressure creates squeezing on the pressure sensor 142, and the detected real-time pressure data is provided to the controller 136 by the pressure sensors 142. If the real-time pressure detected by the pressure sensor 142 is greater than a predetermined value, then the controller controls the actuator to generate an action. For example, if the actuator is an alarm, it will be driven to generate an alarm. If the actuator is a switch, it will be driven to be disconnected to cut off the internal circuit of the pouch battery 122 to achieve safety protection.

Having thus described several embodiments, those skilled in the art will recognize that various modifications, other structures, and equivalents may be used without departing from the spirit of the invention. Accordingly, the above description should not be taken as a limitation to the protection scope of the invention as defined by the following claims.

For example, the safety protection device described in the above embodiment may be a circuit breaker, or an actuator controlled by a controller on a circuit board or the like. However, those skilled in the art will appreciate that other types of safety protection devices may also fall within the scope of the present invention, as long as such safety protection devices are capable of performing corresponding protection actions based on the gas pressure inside the pouch battery.

In addition, only the circuit breaker to which the anode tab is connected is shown in the pouch battery 22 illustrated in FIGS. 2a-2b. However, it needs to be understood that this does not mean that only the anode tab may be connected to the circuit breaker. Conversely, only the cathode tab may be connected to the circuit breaker in the pouch battery, or the anode and cathode tab can be connected to their respective circuit breakers at the same time. Such designs can be varied by one skilled in the art in light of the specific design requirements.

What is claimed is:

1. A pouch battery comprising:
a pouch;
an electrode material located in the pouch;
an anode tab extending from the pouch;
a cathode tab extending from the pouch; and
an electrically-conductive adhesive configured to directly secure the electrode material to at least one selected from a group consisting of the anode tab and the cathode tab to provide an electrical connection between the electrode material and the at least one selected from the group consisting of the anode tab and the cathode tab;
wherein the at least one selected from the group consisting of the anode tab and the cathode tab is connected to an inner surface of the pouch such that the at least one selected from the group consisting of the anode tab and the cathode tab is configured to provide a pulling force on the adhesive away from the electrode material to cut off the electrical connection between the electrode material and the at least one selected from the group consisting of the anode tab and the cathode tab in response to an inner space of the pouch expanding due to gas pressure in the pouch reaching a predetermined value.

2. The pouch battery according to claim 1, further comprising a tab-film at a front end of the pouch and configured to hold the at least one selected from the group consisting of the anode tab and the cathode tab, wherein the tab-film is configured to remain intact when the electrical connection between the electrode material and the at least one selected from the group consisting of the anode tab and the cathode tab is cut off.

3. The pouch battery according to claim 1, wherein the pouch is configured to remain sealed when the electrical connection between the electrode material and the at least one selected from the group consisting of the anode tab and the cathode tab is cut off.

4. The pouch battery according to claim 1, wherein the electrically-conductive adhesive is applied to a first surface of the at least one selected from the group consisting of the anode tab and the cathode tab.

5. The pouch battery according to claim 4, wherein a second surface of the at least one selected from the group consisting of the anode tab and the cathode tab is connected to the inner surface of the pouch.

6. The pouch battery according to claim 5, wherein the second surface of the at least one selected from the group consisting of the anode tab and the cathode tab is connected to the inner surface of the pouch via welding.

7. The pouch battery according to claim 1, wherein the pouch battery is configured to stop outputting power when the electrical connection between the electrode material and the at least one selected from the group consisting of the anode tab and the cathode tab is cut off.

* * * * *